(12) United States Patent
Eaton et al.

(10) Patent No.: US 8,931,534 B2
(45) Date of Patent: Jan. 13, 2015

(54) VEHICLE WHEEL ASSEMBLIES AND VALVES FOR USE WITH A CENTRAL TIRE INFLATION SYSTEM

(75) Inventors: James K. Eaton, Brighton, MI (US); David E. Kritzell, Doylestown, PA (US); Daniel E. Shy, Boston Heights, OH (US); Donald A. Hohman, Green, OH (US)

(73) Assignee: Accuride Corporation, Evansville, IN (US)

( * ) Notice: Subject to any disclaimer, the term of this patent is extended or adjusted under 35 U.S.C. 154(b) by 490 days.

(21) Appl. No.: 12/721,367

(22) Filed: Mar. 10, 2010

(65) Prior Publication Data

US 2011/0221261 A1    Sep. 15, 2011

(51) Int. Cl.
  *B60C 23/10* (2006.01)
  *B60C 23/00* (2006.01)
  *B60C 29/02* (2006.01)

(52) U.S. Cl.
  CPC .............. *B60C 23/003* (2013.01); *B60C 29/02* (2013.01); *B60C 2200/14* (2013.01)
  USPC .......................................... 152/416; 152/415

(58) Field of Classification Search
  USPC ......................................... 152/415–416, 427
  See application file for complete search history.

(56) References Cited

U.S. PATENT DOCUMENTS

| | | |
|---|---|---|
| 2,884,042 A | 4/1959 | Seaton |
| 2,988,126 A | 6/1961 | Wells et al. |
| 3,121,455 A | 2/1964 | Scott |
| 4,369,826 A | 1/1983 | Hendrickson |
| 4,418,737 A | 12/1983 | Goodell |
| 4,434,833 A | 3/1984 | Swanson et al. |
| 4,441,539 A | 4/1984 | Hulse |
| 4,682,640 A | 7/1987 | Berger et al. |
| 4,723,445 A | 2/1988 | Ripley et al. |
| 4,733,707 A | 3/1988 | Goodell et al. |
| 4,987,937 A | 1/1991 | Nowicke |
| 5,094,263 A | 3/1992 | Hurrell, II et al. |

(Continued)

FOREIGN PATENT DOCUMENTS

| | | |
|---|---|---|
| DE | 2141087 | 2/1973 |
| DE | 2918481 | 11/1980 |

(Continued)

OTHER PUBLICATIONS

International Search Report for PCT/US2011/027000 mailed Aug. 3, 2011.

*Primary Examiner* — Jason Bellinger
(74) *Attorney, Agent, or Firm* — Finnegan, Henderson, Farabow, Garrett & Dunner, LLP (57) ABSTRACT

Wheel assemblies and valves for use with central tire inflation systems are provided. A wheel assembly may include a wheel having a rim and a wall extending radially inwardly from the rim. The wall may include an inboard side and an outboard side, and a central opening therethrough. The wheel may include a wheel duct for communicating pressurized fluid to a tire. A valve may be secured to the wheel wall. The valve may include an inboard side and an outboard side. The valve may include a hub interface adapted to extend from its inboard side. The hub interface may be adapted to extend around the wheel wall. The valve may include an inlet duct opening on the hub interface to communicate with a duct in a wheel hub on which the wheel is mounted. The valve may also include an outlet duct configured to communicate with the wheel duct.

19 Claims, 10 Drawing Sheets

(56) References Cited

U.S. PATENT DOCUMENTS

| | | |
|---|---|---|
| 5,261,273 A | 11/1993 | Imani et al. |
| 5,343,920 A | 9/1994 | Cady |
| 5,979,526 A | 11/1999 | Chamoy |
| 6,145,558 A | 11/2000 | Schmitz |
| 6,474,383 B1 | 11/2002 | Howald et al. |
| 7,168,468 B2 | 1/2007 | Wang et al. |
| 7,451,794 B1 | 11/2008 | Baird et al. |
| 8,122,926 B2 * | 2/2012 | Rogers .................... 152/427 |
| 2007/0204946 A1 | 9/2007 | Medley et al. |
| 2008/0149243 A1 | 6/2008 | Resare et al. |
| 2009/0000716 A1 | 1/2009 | Isono |
| 2009/0266460 A1 | 10/2009 | Resare et al. |
| 2010/0147387 A1 * | 6/2010 | Medley et al. ............ 152/427 |
| 2010/0163148 A1 | 7/2010 | Rogers |

FOREIGN PATENT DOCUMENTS

| | | |
|---|---|---|
| EP | 0 071 278 | 2/1983 |
| EP | 0 284 507 | 9/1988 |
| EP | 0 407 126 | 1/1991 |
| FR | 1178496 | 4/1959 |
| GB | 694476 | 7/1953 |
| GB | 988603 | 4/1965 |
| GB | 1 561 531 | 2/1980 |
| JP | 63-126106 | 8/1988 |
| JP | 2000-255228 | 9/2000 |

* cited by examiner

VEHICLE WHEEL ASSEMBLIES AND VALVES FOR USE WITH A CENTRAL TIRE INFLATION SYSTEM

BACKGROUND

I. Field

The present disclosure relates to vehicle wheel assemblies and valves for use with a central tire inflation system.

II. Background Information

Certain vehicles, such as those designed for some military applications, are required to travel over a variety of terrains. Because optimal tire pressure varies depending on the terrain, it may be desirable to adjust tire pressure during use. For example, when transitioning from an asphalt highway to a softer surface (e.g., sand, dirt, or snow), it is advisable to lower the vehicle's tire pressure in order to increase the tire's surface contact area, distributing the vehicle's weight over a larger area. However, in certain situations, it may be inconvenient or even dangerous (e.g., when the vehicle is deployed in combat situations) for the operator to exit the vehicle to manually adjust the tire pressure.

Central tire inflation (CTI) systems allow a vehicle's operator to adjust tire pressure without stopping or exiting the vehicle. A CTI system is a vehicle-mounted system that manages pressurized fluid and communicates it to the vehicle's tires. A typical CTI system may include a control switch/system (typically installed near the driver seat), an electronic control unit (ECU), a fluid delivery manifold, and CTI valves at each wheel position. Pressurized fluid may be communicated from a compressor mounted on the vehicle to the fluid delivery manifold via fluid lines. The control switch and ECU may activate valves in the manifold to deliver fluid under pressure via fluid lines mounted to or located within the vehicle body, frame, and axles through the hub to the CTI valves at the wheel positions. The CTI valves are often secured to the wheels on which the tires are mounted.

A CTI system transmits fluid from its source to the vehicle's tires through internal ducts in the wheels and/or wheel hubs, external conduits, or some combination thereof. Providing internal ducts inside the wheels and/or wheel hubs may offer certain advantages over external conduits. For example, external conduits may catch on something or be damaged in a variety of other ways. Given that CTI systems are often employed on vehicles used in rugged or dangerous environments, the risk to external conduits may be considerable. Thus, it is known in the art to provide ducts inside a wheel for communicating compressed air from a source to a wheel-mounted valve, and from the valve to a tire.

However, providing an internal duct through the wheel for communicating fluid between a CTI system and a valve also introduces potential difficulties. For example, the interface between the wheel's fluid duct and other components of the CTI system is susceptible to damage at various stages of the wheel's life (e.g., during manufacture, assembly, maintenance, or in use). If a wheel's CTI duct becomes damaged, that wheel must likely be discarded. Further, the interface between a wheel's CTI duct and the wheel is typically sealed using an o-ring or some other type of seal. These seals are also susceptible to damage or decay, which can result in fluid leaking at the interface between the wheel duct and the other components of the CTI system. It is also advantageous to make seals, conduits, and passages easily accessible for cleaning or replacement as needed to maintain the system. Wheels comprising a duct to carry fluid from a CTI system to a wheel-mounted valve may prevent or limit access to such seals, conduits, or passages when mounted on a wheel hub, making it necessary to remove the wheel to access the seals, conduits, and/or passages.

SUMMARY

Consistent with implementations of the present invention, wheel assemblies and valves for use with a central tire inflation system are disclosed.

A vehicle wheel assembly may include a wheel comprising a generally circular rim and a wall extending radially inwardly from the rim. The wall may comprise an inboard side and an outboard side, and have therethrough a central opening. The wheel may also include a wheel duct formed within the wheel. The wheel duct may include a first end and a second end. The wheel assembly may also include a valve secured to the outboard side of the wall. The valve may include an inboard side and an outboard side. The valve may also include an inlet duct and an outlet duct. The valve may also include a hub interface adapted to extend from the inboard side of the valve, wherein the hub interface is also adapted to extend around the wall of the wheel. The valve's inlet duct may open on the hub interface and may be configured to interface with a hub duct in a wheel hub. The valve's outlet duct may interface with the first end of the wheel duct.

A valve may comprise an inboard side and an outboard side. The valve may also include an inlet duct for receiving fluid from a tire inflation system. The valve may also include an outlet duct through which fluid may exit the valve. The valve may further comprise a hub interface extending from the inboard side. The valve's inlet duct may open on the hub interface and may be configured to interface with a duct in a wheel hub.

A vehicle wheel may include a wheel comprising a generally circular rim, and a wall extending radially inwardly from the rim. The wall may have an inboard side and an outboard side, and may include a central opening therethrough. The wall may include a groove formed therethrough, which may be open to the central opening of the wall. The groove may be adapted to provide access to a duct in a wheel hub. The wheel may also include a wheel duct formed within the wheel. The wheel duct may include a first end and a second end. The wheel duct may be adapted to communicate fluid between a valve and a tire.

BRIEF DESCRIPTION OF THE DRAWINGS

The accompanying drawings, which are incorporated in and constitute a part of this disclosure, illustrate various implementations and aspects of the present invention. In the drawings.

DETAILED DESCRIPTION

The following detailed description refers to the accompanying drawings. Where the same reference numbers are used in the drawings and the following description, such reference numbers refer to the same or similar components or processes. While several exemplary versions and aspects of the invention are described herein, modifications, adaptations and other implementations are possible without departing from the spirit and scope of the invention. For example, substitutions, additions and/or modifications may be made to the components illustrated in the drawings. Accordingly, the following detailed description does not limit the invention. Instead, the proper scope of the invention is defined by the appended claims.

The present description relates to wheel assemblies, including valves, for use with central tire inflation systems that allow a vehicle's operator to adjust the pressure in the vehicle's tires during operation of the vehicle. More specifically, the present description relates to wheel assemblies and valves configured to communicate fluid (e.g., compressed air) between a source of fluid and a vehicle's tires via ducts that are not exposed to the environment, while minimizing the number of ducts through the wheel.

Figure 1:
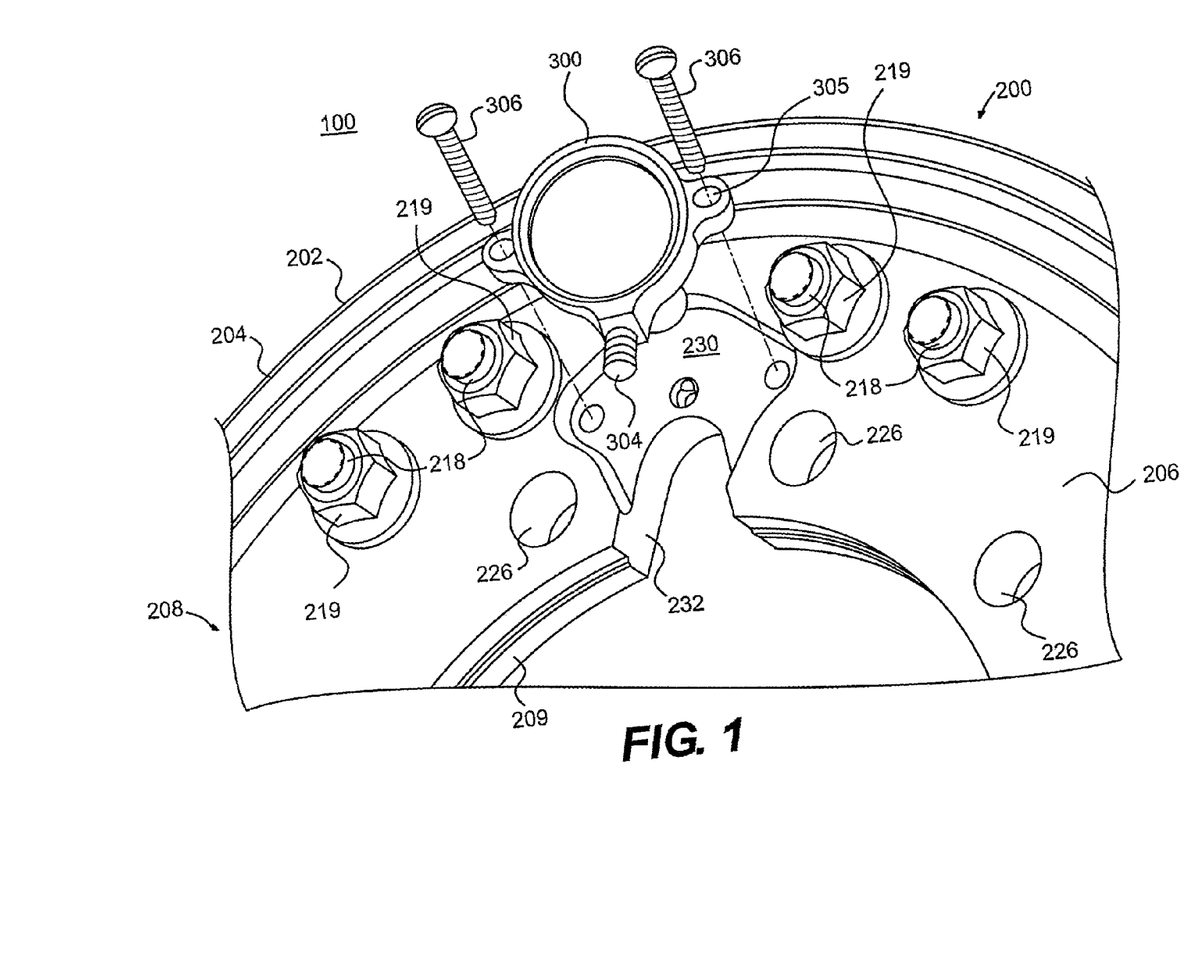
FIG. 1 is an exploded, partial view of one implementation of a wheel assembly consistent with the principles of the present invention.

FIG. 1 illustrates one exemplary embodiment of a wheel assembly 100. Wheel assembly 100 may comprise a wheel 200. Wheel 200 may comprise a generally circular rim 202. Rim 202 may include flanges 204 for engaging the beads of a tubeless tire as known in the art. Wheel 200 may also comprise a wall 206 extending radially inwardly from rim 202. Wall 206 may include a central opening 209. Wall 206 may be generally disc-shaped, as shown in FIG. 1. Alternatively, wall 206 may take many other forms. For example, wall 206 may comprise a number of spokes extending radially inwardly from rim 202.

Wheel wall 206 may also comprise a number of through-holes 226 that receive bolts (not pictured) for mounting wheel 200 on a wheel hub of a vehicle. As illustrated in FIG. 1, through-holes 226 may be formed in a generally circular pattern around central opening 209. However, the number of through-holes 226 and their distribution around central opening 209 may vary. Wheel 200 may be formed of various materials, including aluminum or steel. Wheel 200 may be formed using a variety of techniques, including, for example, casting (e.g., gravity casting or low-pressure casting), spun-rim, flow-forming, or rim-rolling technology, forging, or some combination thereof.

As shown in FIG. 1, wheel assembly 100 may also include a valve 300 for regulating the flow of fluid between the CTI system and a tire mounted on wheel 200 as known in the art. Valve 300 may include a valve stem 304 so that an offboard fluid source may be used to introduce fluid to a tire mounted on wheel 200, or to permit manual release of fluid from the tire. Valve 300 may include one or more through-holes 305 for receiving screws 306 for mounting valve 300 on wheel 200. Valve 300 may also be mounted on wheel 200 using nut-and-bolt combinations or other techniques known in the art. Wheel wall 206 may include a depression 230 in which valve 300 is mounted to prevent valve 300 from extending beyond the tire envelope. Wheel 200 may also comprise a groove 232 through wall 206. Groove 232 may open on central opening 209.

Figure 2:
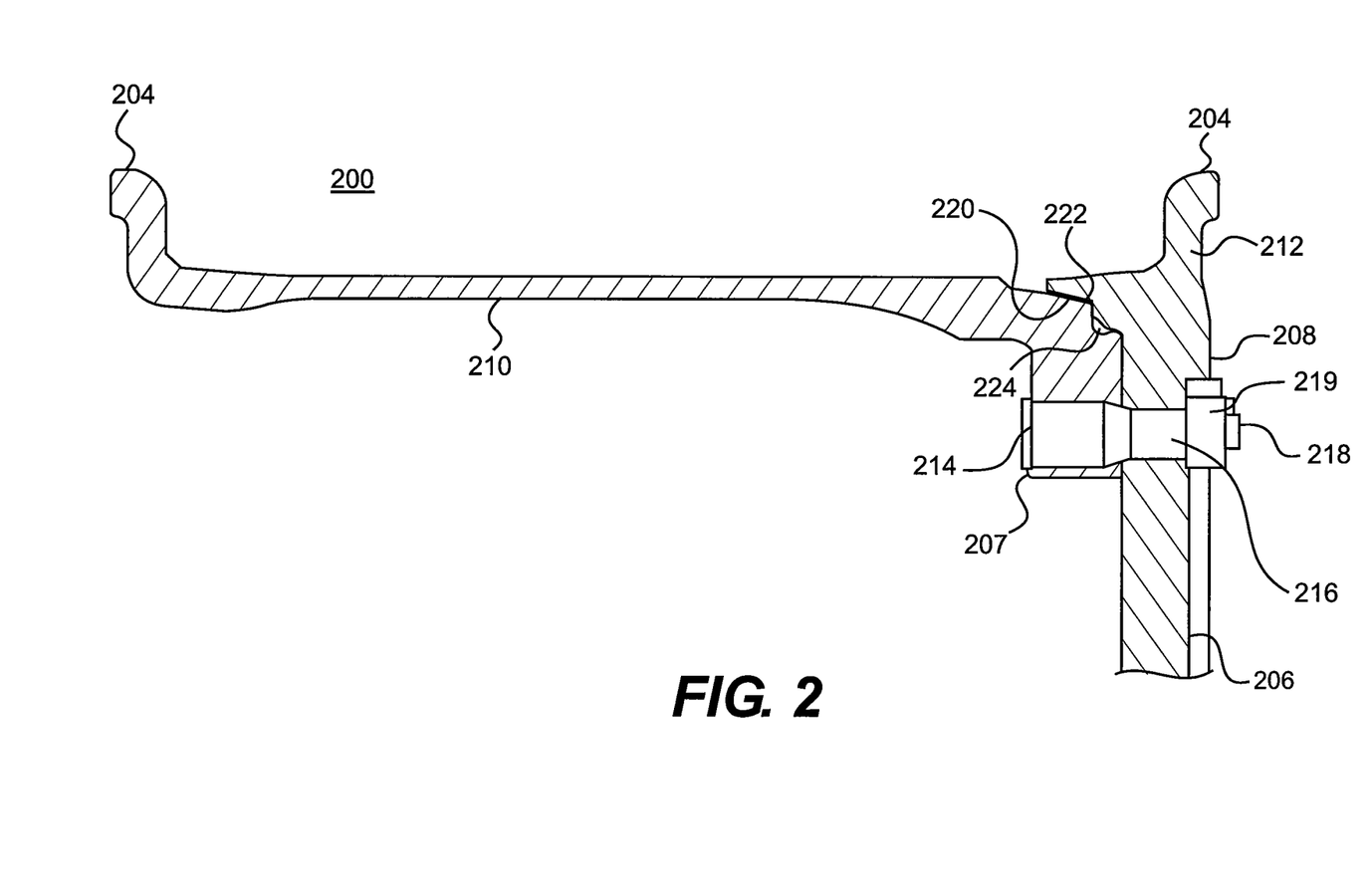
FIG. 2 is a partial cross-sectional view of the wheel shown in FIG. 1.

As illustrated in FIG. 2, wall 206 may comprise an inboard side 207 and an outboard side 208. Central opening 209 may extend from inboard side 207 to outboard side 208. Wheel 200 may be a one-piece wheel or, alternatively, may comprise multiple components. For example, as illustrated in FIG. 2, wheel 200 may be a two-piece wheel comprising an inner wheel half 210 and an outer wheel half 212. Inner half 210 and outer half 212 may comprise a number of through-holes 214 and 216, respectively. Bolts 218 may be inserted through through-holes 214 and 216 and may be engaged by nuts 219 to secure the wheel halves 210, 212 to one another. The number of through-holes 214, 216, and their location on wheel halves 210, 212, respectively, may vary. As illustrated in FIG. 2, wheel halves 210, 212 may include mating surfaces 220, 222, respectively. Wheel 200 may include a seal 224 between mating surfaces 220, 222.

Figure 3:
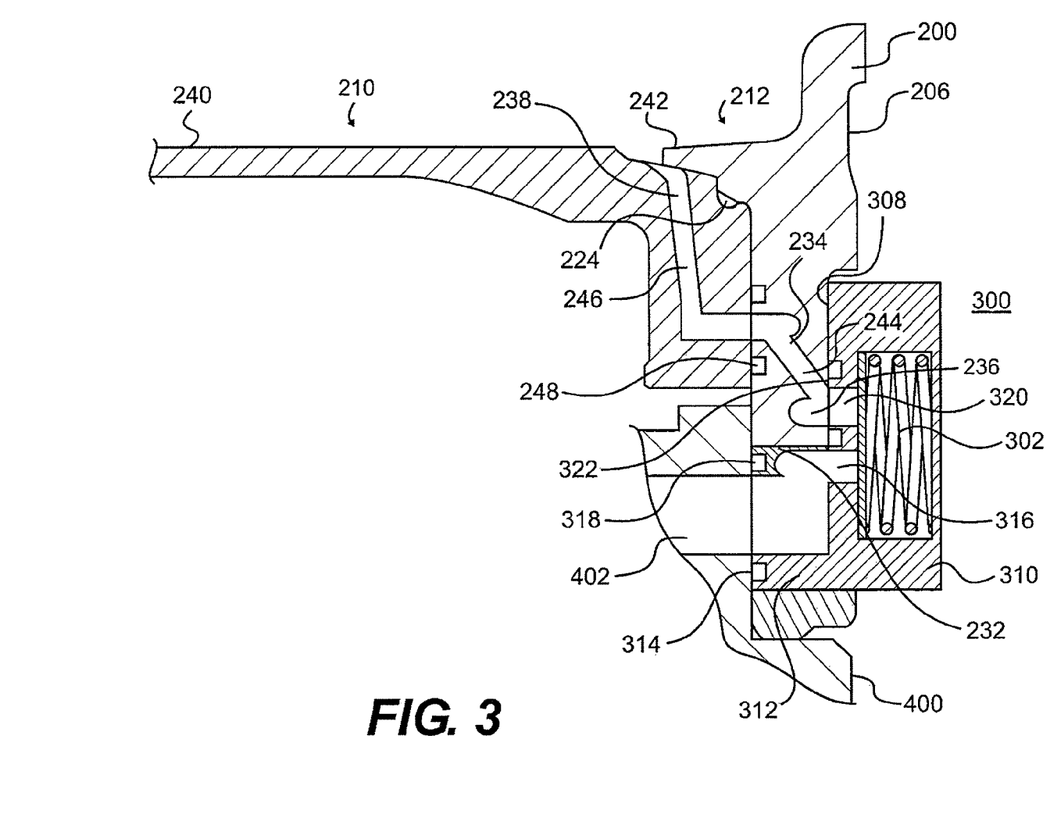
FIG. 3 is a partial cross-sectional view of the wheel assembly shown in FIG. 1.

As shown in FIG. 3, valve 300 may include a conventional valve mechanism 302. As known in the art, a CTI valve may include a spring biasing a diaphragm to contact a valve seat, creating a seal. In the seated position, the diaphragm may prevent fluid from entering or leaving the tire chamber. The valve may be actuated when fluid pressure from the CTI system (supply pressure) increases enough to overcome the spring force pushing the diaphragm to the seated position, referred to as cracking pressure. Typically, there are two types of valve actuation: (1) the supply pressure is regulated to be greater than the tire pressure, resulting in fluid flowing into the tire chamber; and (2) the supply pressure is regulated to be greater than cracking pressure, but less than the tire pressure, resulting in fluid flowing out of the tire chamber, allowing on-vehicle control of tire deflation. In the latter case, fluid leaving the tire chamber may be vented to the atmosphere via a bleed valve.

Valve 300 may comprise an inboard side 308 and an outboard side 310. Valve 300 may include a hub interface 312 extending from inboard side 308. Hub interface 312 may include an inboard surface 314 for interfacing with a wheel hub 400 on which wheel 200 may be mounted. Wheel hub 400 may include a hub duct 402 for communicating fluid from a CTIS (not pictured) to valve 300. Valve 300 may include an inlet duct 316 for communicating with hub duct 402 to receive fluid from the CTIS. Inlet duct 316 may open at one end on inboard surface 314 of hub interface 312. Hub interface 312 may extend around wheel wall 206 such that inboard surface 314 may interface with hub 400 in a manner allowing inlet duct 316 to communicate with hub duct 402. In certain embodiments, and as illustrated in FIG. 3, hub interface 312 may extend around wheel wall 206 such that it extends through groove 232. In other embodiments, hub interface 312 may extend around central opening 209 of wall 206 to allow inlet duct 316 to interface with hub duct 402. In certain embodiments, valve 300 may include a seal 318 (e.g., an o-ring) surrounding the interface of valve inlet duct 316 and hub duct 402 to prevent leaking.

Because valve inlet duct 316 interfaces directly with hub duct 402, wheel wall 206 need not include a fluid duct through which fluid travels from the CTI system to valve 300. This eliminates the risk that such a duct through wheel wall 206 could become damaged, whether in manufacturing, assembly, maintenance, or use, which would likely require the wheel to be discarded. While the possibility exists that valve inlet duct 316 on hub interface 312 could be damaged, valve 300 is typically less expensive than wheel 200. Thus, the prospect of replacing valve 300 may be preferable to replacing wheel 200. Further, there is a risk of fluid leakage at any interface between ducts and/or conduits carrying fluid between the CTI system and the tire (e.g., through damage to or decay of a seal used to prevent leakage at the interface). Allowing valve inlet duct 316 to interface directly with hub duct 402, thereby eliminating the need for a duct in the wheel for communicating fluid between the CTI system and valve 300, eliminates one possible leak site. Further, wheel assembly 100 may permit access to hub duct 402 by removing valve 300 from wheel 200, without requiring that wheel 200 be removed from hub 400.

Referring again to FIG. 3, fluid entering valve 300 through inlet duct 316 may pass through valve mechanism 302 to an outlet duct 320. Outlet duct 320 may open on inboard side 308 of valve 300. Wall 206 of wheel 200 may include a wheel duct 234 having a first end 236 and a second end 238. First end 236 of wheel duct 234 may open on outboard side 208 of wall 206, such that it communicates with valve outlet duct 320. Valve 300 may include a seal 322 (e.g., an o-ring) surrounding the interface of wheel duct 234 and valve outlet duct 320 to prevent leaking at this interface. Instead of or in addition to seal 322, a gasket (not pictured) may be seated in depression 230 of wheel wall 206, and may include an opening allowing fluid to pass between valve outlet duct 320 and wheel duct 234.

As illustrated in FIG. 3, wheel rim 202 may include a rim periphery 240. Rim periphery 240 may be formed by inner wheel half 210 and outer wheel half 212. The intersection of inner wheel half 210 and outer wheel half 212 may form an overhang 242. Wheel duct 234 may open at its second end 238 adjacent overhang 242 formed on rim periphery 240. In this manner, fluid may communicate between wheel duct 320 and the interior of a tubeless tire mounted on wheel 200. Providing overhang 242 may prevent debris inside a tire mounted on wheel 200 from clogging duct 234.

As illustrated in FIG. 3, wheel duct 234 may include an outer section 244 passing through outer wheel half 212 and an inner section 246 passing through inner wheel half 210. Wheel 200 may include a seal 248 (e.g., an o-ring) to prevent leaking at the interface of wheel duct sections 244, 246. Alternatively, wheel duct 234 may pass through only one of wheel halves 210, 212.

Figure 4:
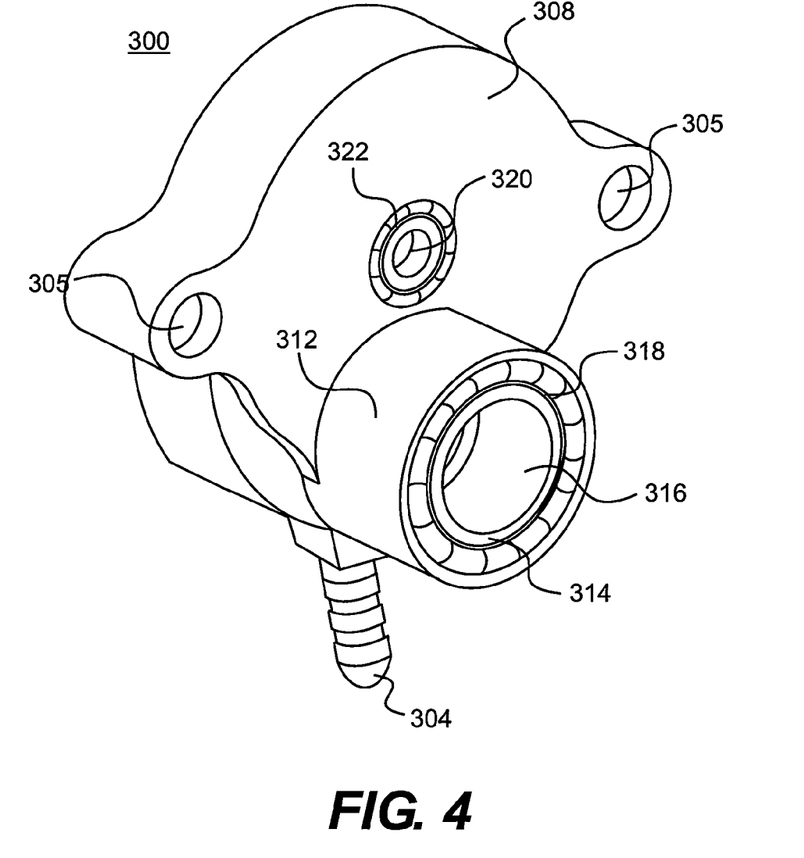
FIG. 4 is a perspective view of the valve shown in FIG. 1.

FIG. 4 illustrates inboard side 308 of valve 300, as well as hub interface 312, which extends from inboard side 308. Valve inlet 316 opens on inboard surface 314 of hub interface 312 for communication with hub duct 402. As shown in FIG. 4, seal 318 may surround the opening of valve inlet 316, though this seal is not present in certain embodiments. In this exemplary embodiment, valve outlet 320 opens on inboard side 308 of valve 300 for communication with wheel duct 234. FIG. 4 shows seal 322 surrounding the opening of valve outlet 320. FIG. 4 also shows through-holes 305, which permit valve 300 to be mounted on wheel 200.

Figure 5:
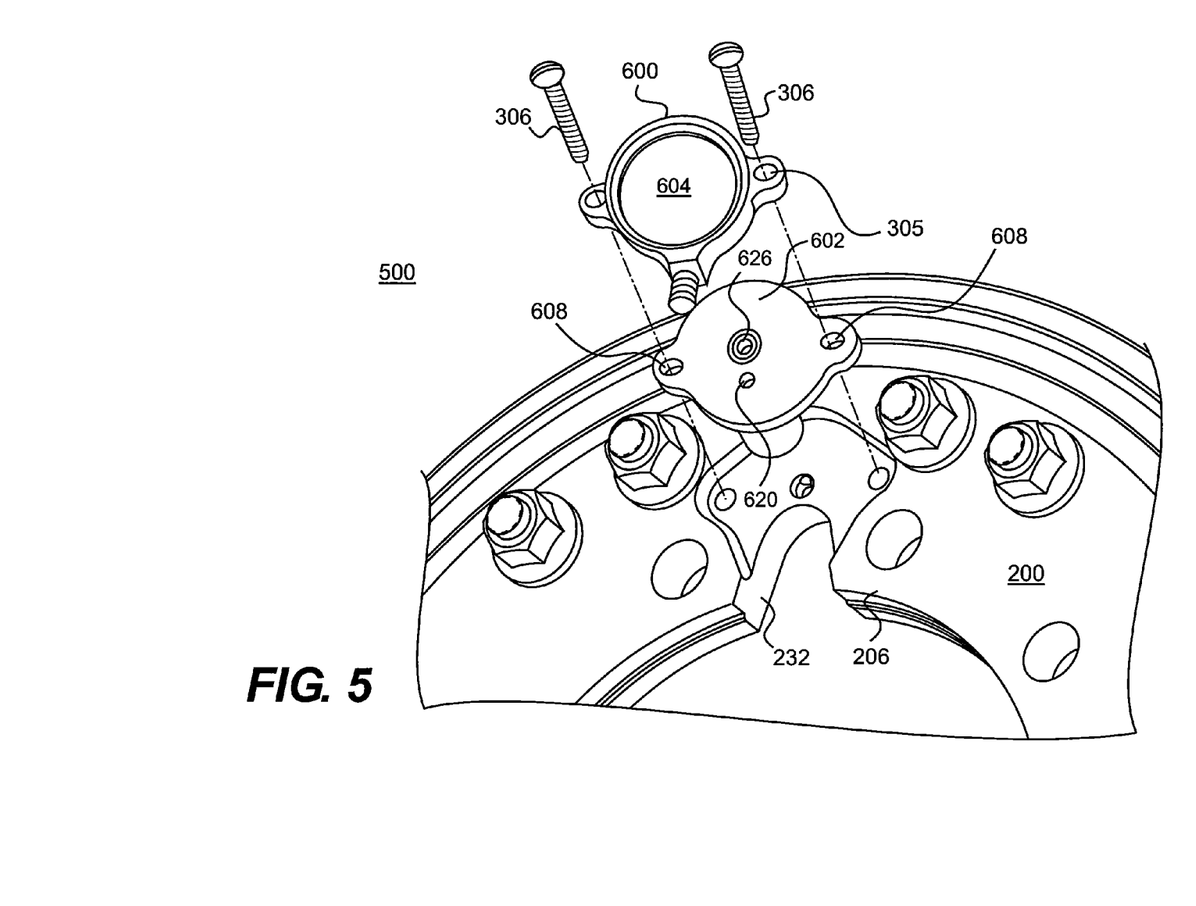
FIG. 5 is an exploded, partial view of a second implementation of a wheel assembly consistent with the principles of the present invention.
Figure 6:
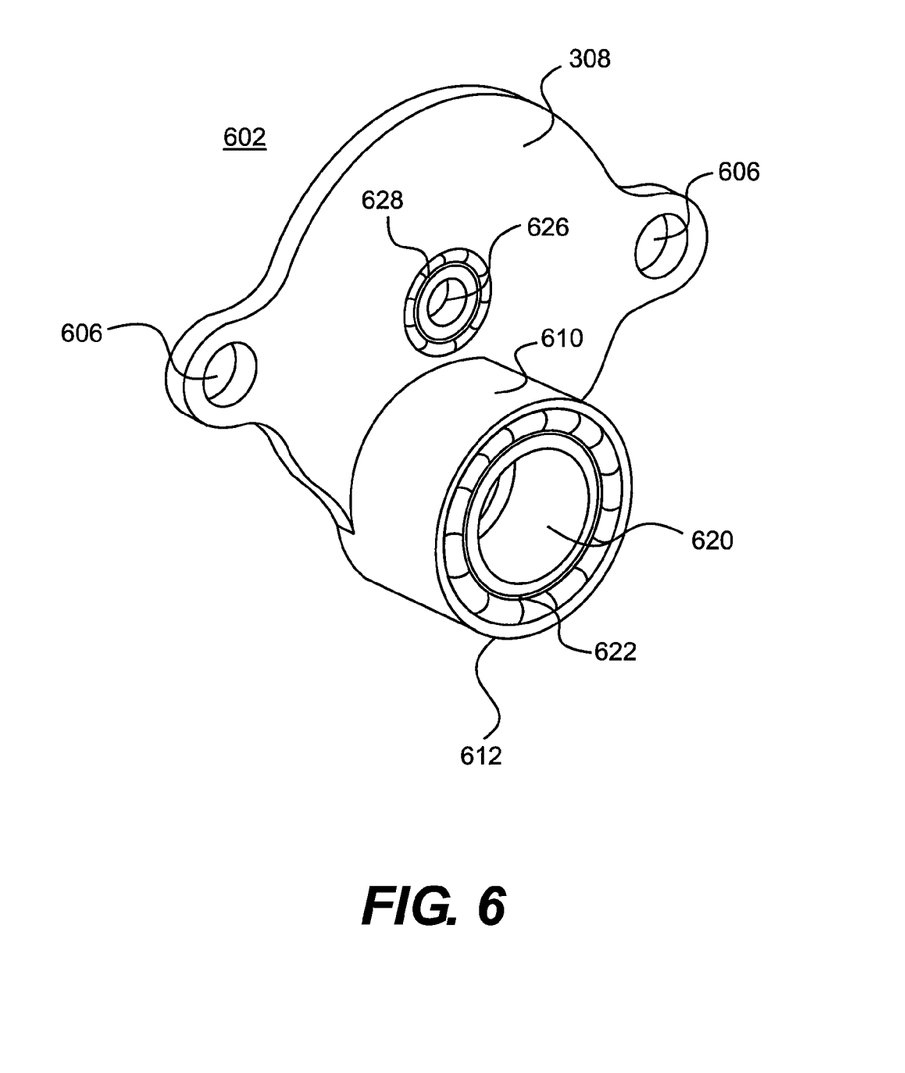
FIG. 6 is a perspective view of the adaptor shown in FIG. 5.
Figure 7:
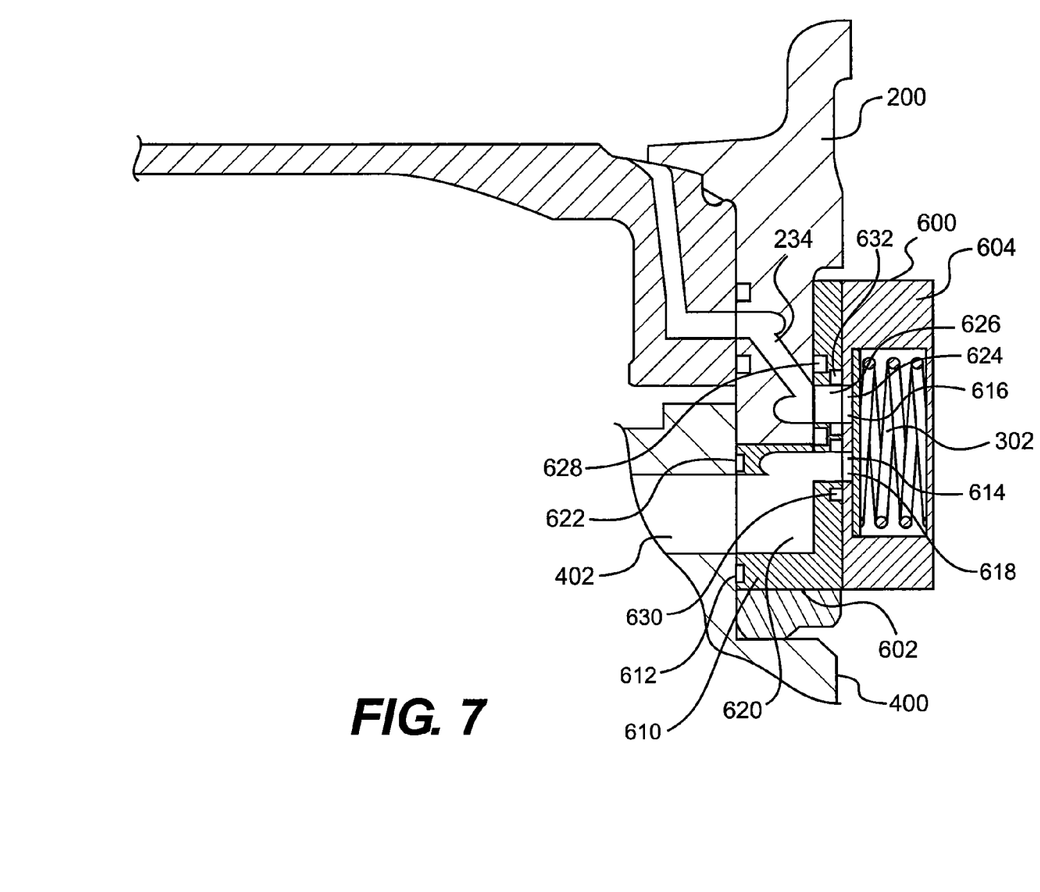
FIG. 7 is a cross-sectional view of the wheel assembly shown in FIG. 5.

In certain circumstances, it may be desirable or necessary to pair a wheel with a valve that was not designed for use with a particular type of wheel or the vehicle on which it is mounted. In such cases, the valve may be provided with an adaptor permitting the valve to mate with the wheel. FIGS. 5-7 illustrate one such exemplary wheel assembly 500.

As shown in FIG. 5, wheel assembly 500 may include a wheel 200 that may be mounted on a wheel hub 400 as described in connection with exemplary wheel assembly 100. Wheel assembly 500 may also include a valve 600. Valve 600 may comprise an adaptor 602 for securing a main body 604 of valve 600 onto wheel 200. Adaptor 602 may include through-holes 608 that align with through-holes 305 in valve main body 604 for receiving screws 306 to mount valve 600 on wheel 200. Alternatively, adaptor 602 may be mounted on wheel 200 using through-holes 608 or some other technique, and valve main body 604 may be separately mounted on adaptor 602 without directly securing valve main body 604 to wheel 200.

As illustrated in FIG. 6, a hub interface 610 may be formed on adaptor 602. Hub interface 610 may include an inboard surface 612 adapted to interface with wheel hub 400. Hub interface 610 may be adapted to extend around wheel wall 206 to interface with wheel hub 400. For example, hub interface 610 may extend around wheel wall 206 such that it extends through groove 232 (see FIG. 5).

As illustrated in FIG. 7, valve 600 may include an inlet duct 614 and an outlet duct 616. Inlet duct 614 may comprise a first section 618 in the main body 604 of valve 600, and a second section 620 formed in adaptor 602. Second section 620 may open at one end on inboard surface 612 of hub interface 610 to interface with hub duct 402. In this manner, adaptor 602 may allow valve inlet duct 614 to interface with hub duct 402. Adaptor 602 may also include a seal 622 (e.g., an o-ring) surrounding the interface between second section 620 of valve inlet duct 614 and hub duct 402 to prevent leaking. Valve outlet duct 616 may also include a first section 624 in the main body 604 of valve 600, and a second section 626 formed in adaptor 602. Second section 626 may communicate at one end with wheel duct 234. In this manner, adaptor 602 may allow valve outlet duct 616 to interface with wheel duct 234. Adaptor 602 may include a seal 628 (e.g., an o-ring) surrounding the interface of second section 626 of valve outlet duct 616 and wheel duct 234 to prevent leaking. Adaptor 602 may include a seal 630 (e.g., an o-ring) between first section of 618 and second section 620 of inlet duct 614. Adaptor 602 may also include a seal 632 (e.g., an o-ring) between first section 624 and second section 626 of outlet duct 616.

Figure 8:
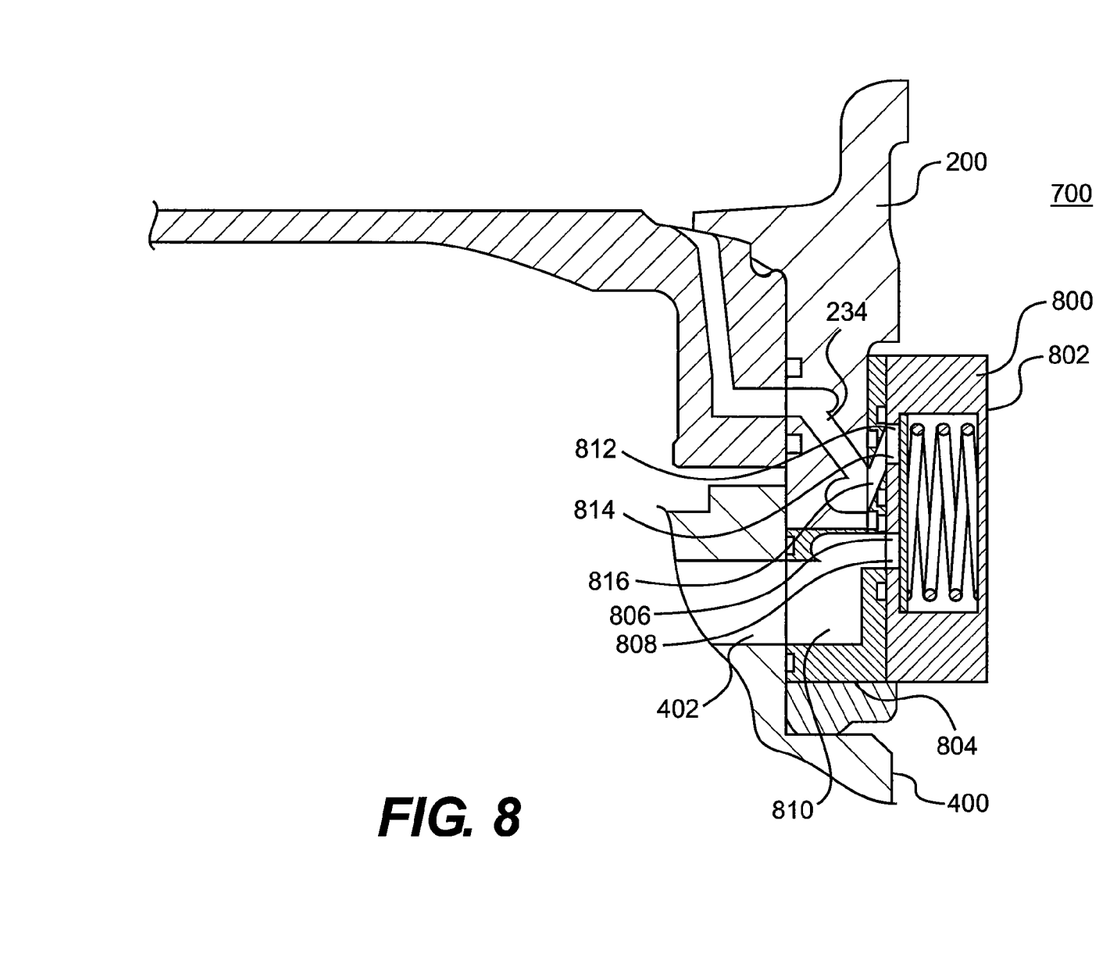
FIG. 8 is cross-sectional view of a third implementation of a wheel assembly consistent with the principles of the present invention.

FIG. 8 illustrates another exemplary wheel assembly 700 comprising a wheel 200, a hub 400, and a valve 800. Valve 800 may comprise a main body 802 and an adaptor 804. Valve 800 may include an inlet duct 806 comprising a first section 808 formed in main body 802 and a second section 810 formed in adaptor 804. As depicted in FIG. 8, second section 810 may realign first section 808 of valve inlet duct 806 to permit inlet duct 806 to interface with hub duct 402. Similarly, valve 800 may include an outlet duct 812 comprising a first section 814 formed in main body 802 and a second section 816 formed in adaptor 804. Second section 816 may realign first section 814 of valve outlet duct 812 to permit outlet duct 812 to interface with wheel duct 234.

Figure 9:
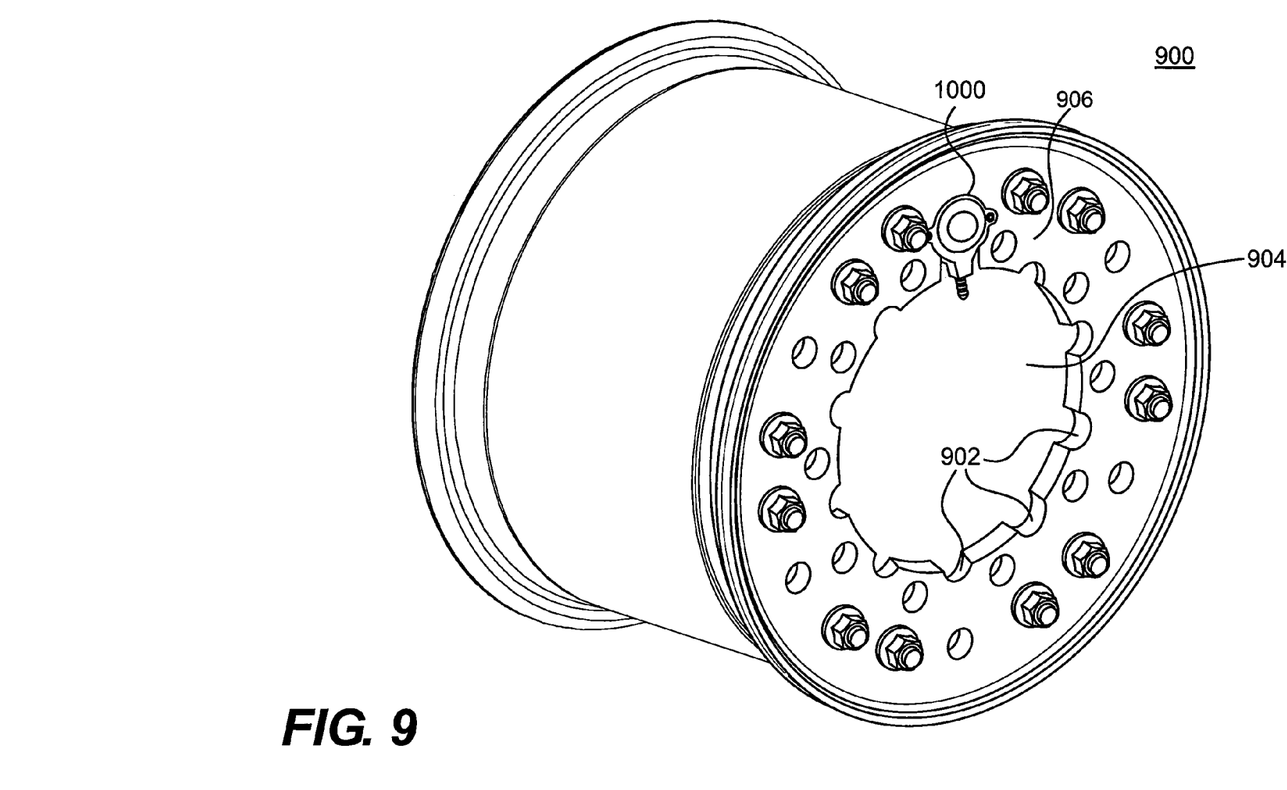
FIG. 9 is a perspective view of a fourth implementation of a wheel assembly consistent with the principles of the present invention.

FIG. 9 shows an exemplary wheel 900, which includes a plurality of grooves 902 surrounding a central opening 904 in a wheel wall 906. A valve 1000 may be secured to the wheel (with or without an adaptor) in any manner, with a hub interface (not pictured) extending around wheel wall 906. For example, the hub interface may extend around wheel wall 906 such that it extends through one of grooves 902 to interface with duct 402 in wheel hub 400 (see, e.g., FIG. 3). The plurality of grooves 902 may be distributed in a manner that reduces the weight of wheel 900 without materially impacting its structural integrity. While FIG. 9 shows grooves 902 distributed in a circular pattern surrounding central opening 904, the number, shape, spacing, and location of grooves 902 may vary.

Figure 10:
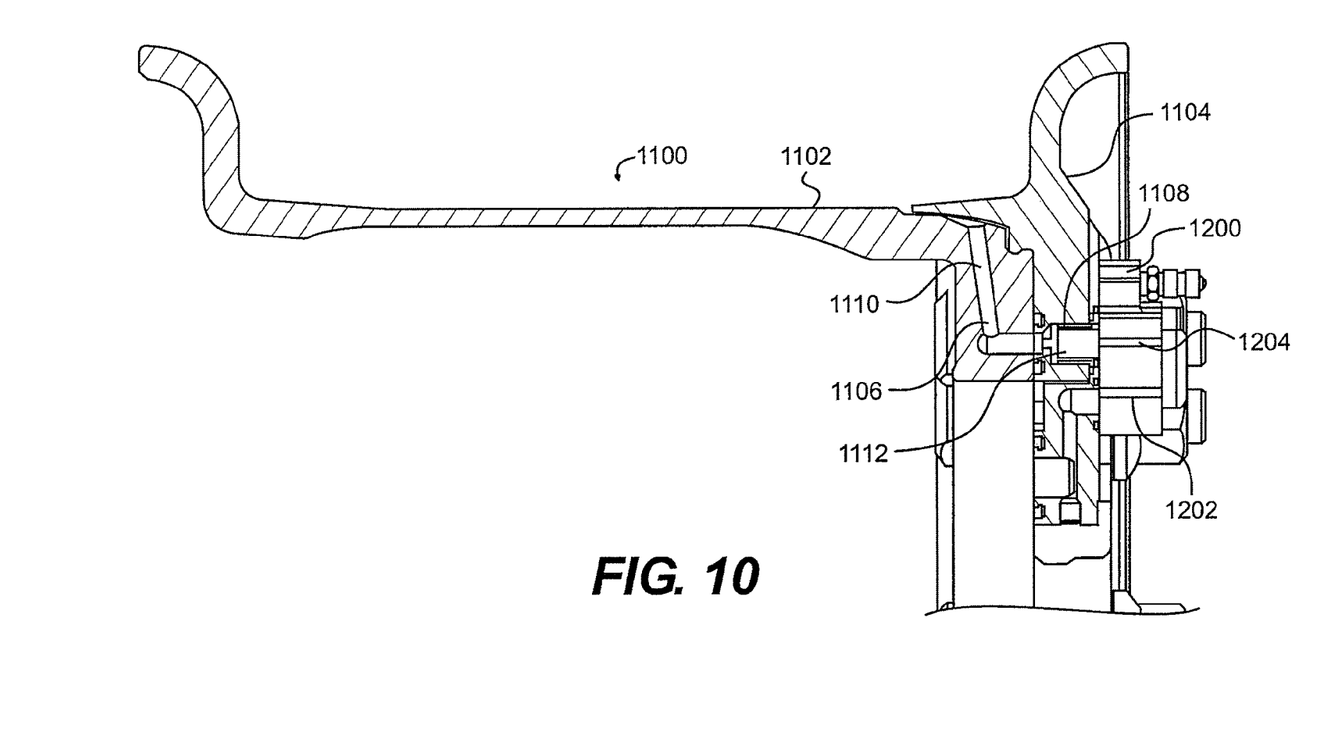
FIG. 10 is a partial cross-sectional view of a fifth implementation of a wheel assembly consistent with the principles of the present invention.

FIG. 10 shows an exemplary wheel 1100, with a valve 1200 mounted thereon. Valve 1200 may include an inlet duct 1202 and an outlet duct 1204. Wheel 1100 may include an inner wheel half 1102 and an outer wheel half 1104. Wheel 1100 may include a wheel duct 1106 to interface with valve outlet duct 1204 and communicate air to a tire mounted on wheel 1100. Wheel duct 1106 may include a first section 1108 in outer wheel half 1104 and a second section 1110 in inner wheel half 1102. As shown in FIG. 10, a filter 1112 may be located in first section of wheel duct 1108, allowing filter 1112 to be accessed by removing a valve mounted on wheel 1100. Alternatively, filter 1112 could be placed in second section 1110 of wheel duct 1106.

While certain features and embodiments of the invention have been described, other embodiments of the invention will be apparent to those skilled in the art from consideration of the specification and practice of the aspects of the invention disclosed herein. It is intended, therefore, that the specification and embodiments described herein be considered as exemplary only, with a true scope and spirit of the invention being indicated by the following claims and their full scope of equivalents.

What is claimed is:

1. A vehicle wheel assembly comprising:
    a wheel comprising
        a generally circular rim,
        a wall extending radially inwardly from the rim, the wall having an inboard side and an outboard side, and having therethrough a central opening,
        a wheel duct formed within the wheel, the wheel duct including a first end that opens on the outboard side of the wall of the wheel and a second end; and
        a valve secured to the outboard side of the wall, the valve comprising
            an inboard side and an outboard side,
            an inlet duct and an outlet duct, and
            a hub interface adapted to extend inwardly from the inboard side of the valve,
            wherein the inlet duct opens on the hub interface and is configured to directly interface with a hub duct in a wheel hub, and
            wherein the outlet duct interfaces with the first end of the wheel duct.

2. The vehicle wheel assembly of claim 1, wherein the wall includes a groove formed therethrough, wherein the hub interface is adapted to extend through the groove.

3. The vehicle wheel assembly of claim 2, wherein the groove is one of a plurality of grooves surrounding the central opening of the wheel.

4. The vehicle wheel assembly of claim 1, wherein the valve comprises an adaptor, and wherein the hub interface is formed on the adaptor.

5. The vehicle wheel assembly of claim 4, wherein the adaptor is configured to align the inlet duct of the valve with a hub duct of a wheel hub.

6. The vehicle wheel assembly of claim 4, wherein the adaptor is configured to align the outlet duct of the valve with the wheel duct.

7. The vehicle wheel assembly of claim 1, wherein the wheel comprises an inner wheel portion and an outer wheel portion, wherein the first end of the wheel duct is located in the outer wheel portion, and the second end of the wheel duct is located in the inner wheel portion.

8. The vehicle wheel assembly of claim 1, further including a filter in the wheel duct.

9. A vehicle wheel assembly comprising:
    a wheel comprising
        a generally circular rim,
        a wall extending radially inwardly from the rim, the wall having an inboard side and an outboard side, and having therethrough a central opening,
        a wheel duct formed within the wheel, the wheel duct including a first end and a second end; and
        a valve secured to the outboard side of the wall so as to allow access to a wheel hub through the central opening of the wheel while the valve is secured to the outboard side of the wall, the valve comprising
            an inboard side and an outboard side,
            an inlet duct and an outlet duct, and
            a hub interface adapted to extend inwardly from the inboard side of the valve,
            wherein the inlet duct opens on the hub interface and is configured to directly interface with a hub duct in the wheel hub, and
            wherein the outlet duct interfaces with the first end of the wheel duct.

10. The vehicle wheel assembly of claim 9, wherein the valve further comprises a main body and an adaptor, wherein the hub interface is formed on the adaptor.

11. The vehicle wheel assembly of claim 10, wherein the adaptor is configured to align the inlet duct of the valve with the hub duct of the wheel hub.

12. The vehicle wheel assembly of claim 10, wherein the adaptor is configured to align the outlet duct of the valve with the wheel duct.

13. The vehicle wheel assembly of claim 10, wherein the main body is configured to be secured to the adaptor.

14. A vehicle wheel comprising:
    a generally circular rim;
    a wall extending radially inwardly from the rim, the wall having an inboard side and an outboard side, and having therethrough a central opening, the wall including a groove formed therethrough, the groove being open to the central opening of the wall and extending radially outwardly from the central opening, the groove being adapted to provide access to a duct in a wheel hub;
    a wheel duct formed within the wheel, the wheel duct including a first end and a second end, wherein the wheel duct is adapted to communicate fluid between a valve and a tire.

15. The vehicle wheel of claim 14, wherein the first end of the wheel duct opens on the outboard side of the wall of the wheel.

16. The vehicle wheel of claim 14, wherein the wheel comprises an inner wheel portion and an outer wheel portion, wherein the first end of the wheel duct is located in the outer wheel portion, and the second end of the wheel duct is located in the inner wheel portion.

17. The vehicle wheel of claim 16, wherein the wheel comprises a filter located in the wheel duct in the outer wheel portion.

18. The vehicle wheel of claim 14, wherein the groove comprises a plurality of grooves surrounding the central opening of the wheel.

19. The vehicle wheel of claim 14, further including a filter in the wheel duct.

* * * * *